United States Patent
Iguchi (10) Patent No.: US 10,697,548 B2
(45) Date of Patent: Jun. 30, 2020

(54) MECHANICAL SEAL

(71) Applicant: Eagle Industry Co., Ltd., Tokyo (JP)

(72) Inventor: Tetsuya Iguchi, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 54 days.

(21) Appl. No.: 16/084,931

(22) PCT Filed: Apr. 18, 2017

(86) PCT No.: PCT/JP2017/015579
§ 371 (c)(1),
(2) Date: Sep. 13, 2018

(87) PCT Pub. No.: WO2017/188060
PCT Pub. Date: Nov. 2, 2017

(65) Prior Publication Data
US 2019/0056030 A1    Feb. 21, 2019

(30) Foreign Application Priority Data

Apr. 27, 2016 (JP) .................................. 2016-088799

(51) Int. Cl.
*F16J 15/34* (2006.01)
(52) U.S. Cl.
CPC ........... *F16J 15/3472* (2013.01); *F16J 15/34* (2013.01); *F16J 15/3448* (2013.01); *F16J 15/3468* (2013.01)
(58) Field of Classification Search
CPC ...... F16J 15/3472; F16J 15/34; F16J 15/3448; F16J 15/3468
See application file for complete search history.

(56) References Cited

U.S. PATENT DOCUMENTS

| | | | |
|---|---|---|---|
| 4,082,296 A | 4/1978 | Stein | 277/3 |
| 4,114,900 A * | 9/1978 | Wiese | F16J 15/3432 277/361 |
| 4,294,453 A * | 10/1981 | Inouye | F16J 15/3404 277/348 |

(Continued)

FOREIGN PATENT DOCUMENTS

| | | | |
|---|---|---|---|
| JP | S52144560 | 12/1977 | ............... F16J 15/34 |
| JP | S552849 | 1/1980 | ............... F16J 15/34 |

(Continued)

OTHER PUBLICATIONS

International Preliminary Report on Patentability issued in application No. PCT/JP2017/015579, dated Nov. 8, 2018 (6 pgs).

(Continued)

*Primary Examiner* — Gilbert Y Lee
(74) *Attorney, Agent, or Firm* — Hayes Soloway P.C.

(57) ABSTRACT

A mechanical seal, which seals a sealed fluid by interposing an intermediate ring between a rotating ring and a stationary ring, includes a first annular effective seal portion where the rotating ring and the intermediate ring slide with each other and a second annular effective seal portion where the stationary ring and the intermediate ring contact with each other. A load receiving portion is arranged between the intermediate ring and the stationary ring in opposition to a side of the sealed fluid across the sealed fluid of the second annular effective seal portion in a radial direction.

7 Claims, 8 Drawing Sheets

(56) References Cited

U.S. PATENT DOCUMENTS

| | | | | |
|---|---|---|---|---|
| 6,916,022 B2* | 7/2005 | Auber | ............... | F16J 15/3464 |
| | | | | 277/352 |
| 2012/0133099 A1* | 5/2012 | Fesl | ............... | F16J 15/3464 |
| | | | | 277/358 |

FOREIGN PATENT DOCUMENTS

| | | | | |
|---|---|---|---|---|
| JP | S5510115 | 1/1980 | ............... | F16J 15/34 |
| JP | S59212574 | 12/1984 | ............... | F16J 15/34 |
| JP | S6237574 | 2/1987 | ............... | F16J 15/34 |
| JP | H04145267 | 5/1992 | ............... | F16J 15/34 |
| JP | H07208612 | 8/1995 | ............... | F16J 15/34 |
| JP | 2002538384 | 11/2002 | ............... | F16J 15/34 |
| JP | 2005249131 | 9/2005 | ............... | F16J 15/34 |

OTHER PUBLICATIONS

Extended European Search Report issued in application No. 17789345.0, dated Nov. 11, 2019 (7 pgs).

International Search Report (w/translation) and Written Opinion issued in application No. PCT/JP2017/015579, dated Aug. 1, 2017 (8 pgs).

* cited by examiner

MECHANICAL SEAL

TECHNICAL FIELD

The present invention relates to a mechanical seal which includes a rotating ring, an intermediate ring, and a stationary ring and is used as a shaft sealing means for a rotating machine.

BACKGROUND ART

A mechanical seal is used for sealing by utilizing a sliding contact between a rotating ring rotating with a rotating shaft and a stationary ring non-rotatably held by a seal housing. The stationary ring needs to be arranged in a narrow space within the seal housing of the rotating machine and is thus subject to constraints on layout and installation. Thus, when the stationary ring is used under a high pressure and a high temperature, the stationary ring may be affected by an irregular internal stress caused by a pressure from a sealed fluid or an irregular internal stress caused by heat of the sealed fluid or sliding heat. In order to prevent influences from such irregular internal stresses, the mechanical seal of an intermediate ring-mediated type, in which an intermediate ring is interposed between the rotating ring and the stationary ring, is used.

As exemplified in Patent Citation 1, the mechanical seal of an intermediate ring-mediated type is mainly configured from a rotating ring fixed on a rotating shaft and rotating with the rotating shaft, a stationary ring held by a seal housing in an axially movable manner, the stationary ring being biased toward the rotating ring side by a spring, and an intermediate ring arranged between the rotating ring and the stationary ring, the intermediate ring being loosely fitted with a pin projected from the stationary ring and held in a relatively non-rotatable manner in a state in which a relative displacement within a predetermined range in an axial direction and in a radial direction is allowed. As a structure of the mechanical seal, annular protrusions are formed on both sides of the intermediate ring in a substantially symmetric manner. In this structure, a sliding surface, which makes a sliding contact with a side surface of the rotating ring, is arranged on a tip end of the annular protrusion at a rotating ring side, and a sealing surface, which makes a contact with a side surface of the stationary ring to seal inside and outside sections in the radial direction, is arranged on a tip end of the annular protrusion at a stationary ring side.

CITATION LIST

Patent Literature

Patent Citation 1: JP 2005-249131 A (FIG. 2)

SUMMARY OF INVENTION

Technical Problem

The intermediate ring-mediated type mechanical seal described above is configured to seal the sealed fluid by a rotation side effective seal portion where the side surface of the rotating ring and the sliding surface of the intermediate ring make a sliding contact, and a stationary side effective seal portion where the side surface of the stationary ring and the sealing surface of the intermediate ring make a contact. The sliding surface contact of the effective seal portion at the rotating ring side is maintained by the annular protrusions formed on both sides of the intermediate ring in a substantially symmetric manner. In this configuration, both effective seal portions arranged on both sides of the intermediate ring are arranged substantially symmetrically with respect to the radial direction of the intermediate ring. This configuration does not cause a problem in sealing property of the effective seal portions, however, it is turned out that such a problem arises when the effective seal portions are arranged differently.

The arrangement of the effective seal portions is adjusted and designed according to a pressure of the sealed fluid or the like. An area of the intermediate ring on which the sealed fluid acts in the radial direction changes depending on this arrangement. As a result, a force acting on the intermediate ring from the sealed fluid changes, thereby causing a risk that the effective seal portion at the rotating ring side does not tightly fit any more. For example, when the pressure is higher on an outer diameter side of the sliding surface than its inner diameter side, a sliding diameter of the effective seal portion at the stationary ring side needs to be set on the outer diameter side. Conversely, when the pressure is lower on the outer diameter side of the sliding surface than its inner diameter side, the sliding diameter of the effective seal portion at the stationary ring side needs to be set on the inner diameter side.

As described above, when both effective seal portions are arranged in different radial distances from a center axis of the intermediate ring, the intermediate ring receives pressing forces in the axial direction through the effective seal portions on both sides. Since the points of application of the pressing forces on two side surfaces of the intermediate ring are deviated in the radial direction, the intermediate ring is subject to deformation stress generated by moment due to the deviation of the application points of the pressing forces. Then, when the intermediate ring is excessively inclined by the deformation stress, the effective seal portion at the sliding ring side cannot maintain the sliding surface contact, thereby causing a risk of losing the sealing property due to excessive wear of the sliding surface of the intermediate ring and the sliding surface of the rotating ring. As such, there has been a limit to a layout adjustment of the sliding surface of the intermediate ring when the intermediate ring is used.

The present invention has been implemented in order to solve the foregoing problem, and an object of the present invention is to provide a mechanical seal of an intermediate ring-mediated type capable of, while securely maintaining a sliding surface contact between a sliding surface of an intermediate ring and a sliding surface of a rotating ring, increasing a degree of freedom in a layout adjustment of positions of the sliding surfaces.

Solution to Problem

A mechanical seal according to a first aspect of the present invention seals a sealed fluid by interposing an intermediate ring between a rotating ring and a stationary ring and is characterized in that the mechanical seal includes a first annular effective seal portion where the rotating ring and the intermediate ring slide with each other and a second annular effective seal portion where the stationary ring and the intermediate ring contact with each other, the rotating ring, the intermediate ring, and the stationary ring being concentrically arranged in a state in which a radius distance of a region of the first annular effective seal portion where a pressure of the sealed fluid is applied and a radius distance of a region of the second annular effective seal portion where a pressure of the sealed fluid is applied are different from each other, and a load receiving portion is arranged between the intermediate ring and the stationary ring in opposition to a side of the sealed fluid across the second annular effective seal portion in a radial direction.

According to the first aspect, the load receiving portion is arranged between the intermediate ring and the stationary ring, thus even when the rotating ring, the intermediate ring, and the stationary ring are concentrically arranged in a state in which the radius distance of the region of the first annular effective seal portion where the pressure of the sealed fluid is applied and the radius distance of the region of the second annular effective seal portion where the pressure of the sealed fluid is applied are different from each other, the sliding surface contact between the sliding surface of the intermediate ring and the sliding surface of the rotating ring can be securely maintained by preventing the moment for inclining the intermediate ring in the radial direction using the load receiving portion without hindering the rotation of the rotating ring.

The mechanical seal according to a second aspect of the present invention is characterized in that the load receiving portion includes a communication path communicating inside and outside sections in the radial direction.

According to the second aspect, the load receiving portion can function as a member that receives an inclining force without having a pressure retaining function.

The mechanical seal according to a third aspect of the present invention is characterized in that the load receiving portion is an annular body.

According to the third aspect, the load receiving portion can be constituted of a small number of components in a well-balanced manner.

The mechanical seal according to a fourth aspect of the present invention is characterized in that the load receiving portion is constituted of a plurality of convex members arranged at equal intervals.

According to the fourth aspect, the intermediate ring can be stably supported over a circumferential direction thereof by the load receiving portion.

The mechanical seal according to a fifth aspect of the present invention is characterized in that the load receiving portion is immovably arranged to the stationary ring or the intermediate ring.

According to the fifth aspect, an arrangement position of the load receiving portion in the radial direction is stabilized, thus the inclination of the intermediate ring can be precisely prevented.

The mechanical seal according to a sixth aspect of the present invention is characterized in that the load receiving portion is formed of a material having the same linear thermal expansion coefficient as that of the stationary ring or the intermediate ring.

According to the sixth aspect, even when a temperature change occurs, the load receiving portion and the stationary ring or the intermediate ring have a smaller difference in a degree of deformation caused by heating, thus the load receiving portion can stably prevent the inclination of the intermediate ring without having an inclination with respect to the stationary ring or the intermediate ring.

DESCRIPTION OF EMBODIMENTS

Modes for carrying out the mechanical seal according to the present invention are described below based on the embodiments.

First Embodiment

The first embodiment of the mechanical seal according to the present invention is described with reference to FIG. 1 to FIG. 5. In the description of the first embodiment, an outer diameter side of an intermediate ring 40 corresponds to a high-pressure side H and an inner diameter side thereof corresponds to a low-pressure side L.

A mechanical seal 20 is a mechanical seal of an intermediate ring-mediated type in which the intermediate ring 40 is interposed between a rotating ring 21 and a stationary ring 30, and is mainly configured from the rotating ring 21, the stationary ring 30, and the intermediate ring 40, which are concentrically arranged. A space between the high-pressure side H corresponding to a sealed region M inside a machine and the low-pressure side L corresponding to an atmospheric region A outside a machine is sealed by an effective seal portion S1 configured from a sliding surface 24 of the rotating ring 21 and a sliding surface 42 of the intermediate ring 40 (a first annular effective seal portion at a rotating ring side), and an effective seal portion S2 configured from a sealing surface 34 as a side surface of the stationary ring 30 and a sealing surface 44 of the intermediate ring 40 (a second annular effective seal portion at a stationary ring side).

In this configuration, the effective seal portion S1 refers to a part where the sliding surface 24 and the sliding surface 42 make a surface contact with each other, and the effective seal portion S2 refers to a part where the sealing surface 34 and the sealing surface 44 make a surface contact with each other. A load receiving portion 50 is integrally formed with the intermediate ring 40 so as to project from the intermediate ring 40 toward the stationary ring 30. The load receiving portion 50 maintains an axial-directional distance between the stationary ring 30 and the intermediate ring 40 and thus has a function of preventing the inclination of the intermediate ring 40 with respect to the radial direction by restricting deformation stress generated by moment applied to the intermediate ring 40.

The rotating ring 21, the stationary ring 30, and the intermediate ring 40 are formed of a ceramic such as silicon carbide (SiC), carbon, a hard metal alloy, or the like, and those materials are not limited as long as they exhibit mechanical strength, self-lubricating property, and wear resistance at a level generally required as a sliding member for sealing. Further, the load receiving portion 50 is preferably made of the same material as that of the intermediate ring 40 in consideration of inclination (deformation) of the sliding surface due to a temperature change caused by heat input from a sealed fluid, sliding heat, and the like. The rotating ring 21, the stationary ring 30, the intermediate ring 40, and load receiving portion 50 are described in detail below.

A base portion 22 of the rotating ring 21 is non-rotatably attached to a sleeve 2 by a retaining member 3. The sleeve 2 is fixedly attached to a rotating shaft 1, and the rotating ring 21 is configured to rotate with the rotating shaft 1. An O-ring 4 is arranged between the sleeve 2 and the retaining member 3 to improve sealing property. An O-ring may be interposed between the sleeve 2 and the rotating ring 21 according to requirement of the sealing. A side surface of the rotating ring 21 on an intermediate ring 40 side constitutes the sliding surface 24.

The stationary ring 30 is housed for attachment in a seal housing 5 that is fixed to a housing of a fluid apparatus not illustrated. A bellows connection portion 31 of the stationary ring 30 at an atmospheric region A side is welded and fixed to one end of a bellows 32 in a fluid-tight manner. The other end of the bellows 32 is welded and fixed to an adaptor 33 that is liquid-tightly fixed to the seal housing 5. Further, a spring receiving portion 36 of the stationary ring 30, arranged so as to extend outward in the radial direction of the stationary ring 30, is abutted on a spring 13 equally arranged along the seal housing 5. The stationary ring 30 is energized by the spring 13 in the axial direction. Further, a pin receiving portion 37 of the stationary ring 30 having a substantially U-shaped cross section and arranged so as to extend in the radial direction of the stationary ring 30, is loosely fitted to a pin 11 that is fixedly attached to the seal housing 5 in a manner so as to extend in the axial direction, and held in a relatively non-rotatable manner in a state in which a relative displacement within a predetermined range in the axial direction and the radial direction is allowed. A side surface of the stationary ring 30 on an intermediate ring 40 side constitutes the sealing surface 34.

An outer circumferential surface 46 of the intermediate ring 40 is energized in a direction of the inner diameter by U-springs 10 equally arranged along a circumferential direction, so that the movement of the intermediate ring 40 in the radial direction is prevented. The U-springs 10 are held by a support piece 6, of which a base end is extended axially from the seal housing 5, and a holding fixture 8 of an L-shaped cross section in a state of being clamped between the support piece 6 and the holding fixture 8. The holding fixture 8 of an L-shaped cross section is fixed to the support piece 6 and the pin 11 by a bolt 9.

Further, a pin receiving portion 47 of the intermediate ring 40, which is a substantially U-shaped cutout of the intermediate ring 40 formed so as to be recessed in the inward radial direction of the intermediate ring 40 in a side view, has the above-mentioned pin 11 loosely fitted thereto, and held in a relatively non-rotatable manner in a state in which a relative displacement within a predetermined range in the axial direction and the radial direction is allowed. That is, the intermediate ring 40, similar to the stationary ring 30, is energized by the spring 13 in the axial direction so as to be attached movably in the axial direction and non-rotatably.

Figure 1:
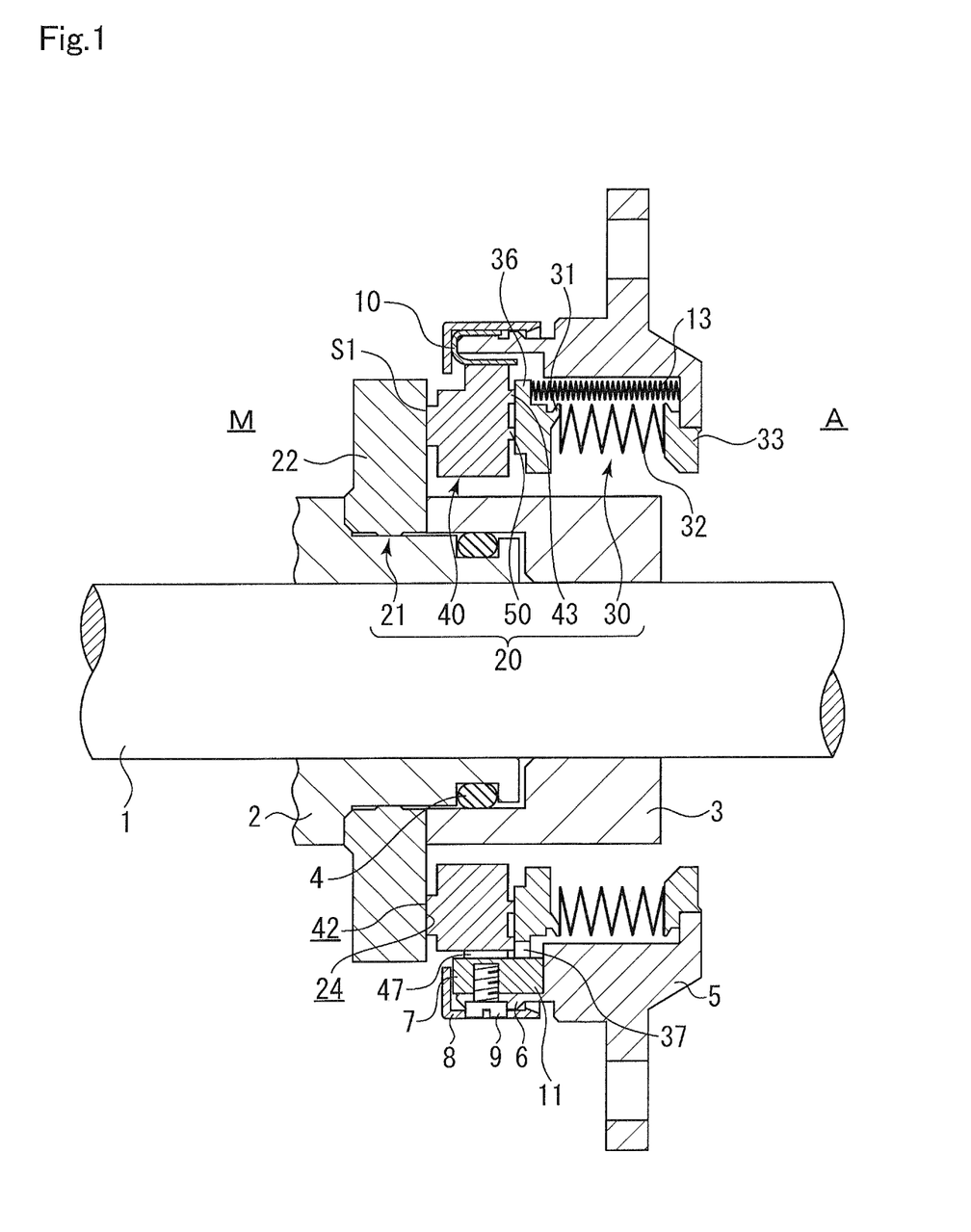
FIG. 1 is a sectional view showing a first embodiment of the mechanical seal according to the present invention.
Figure 2:
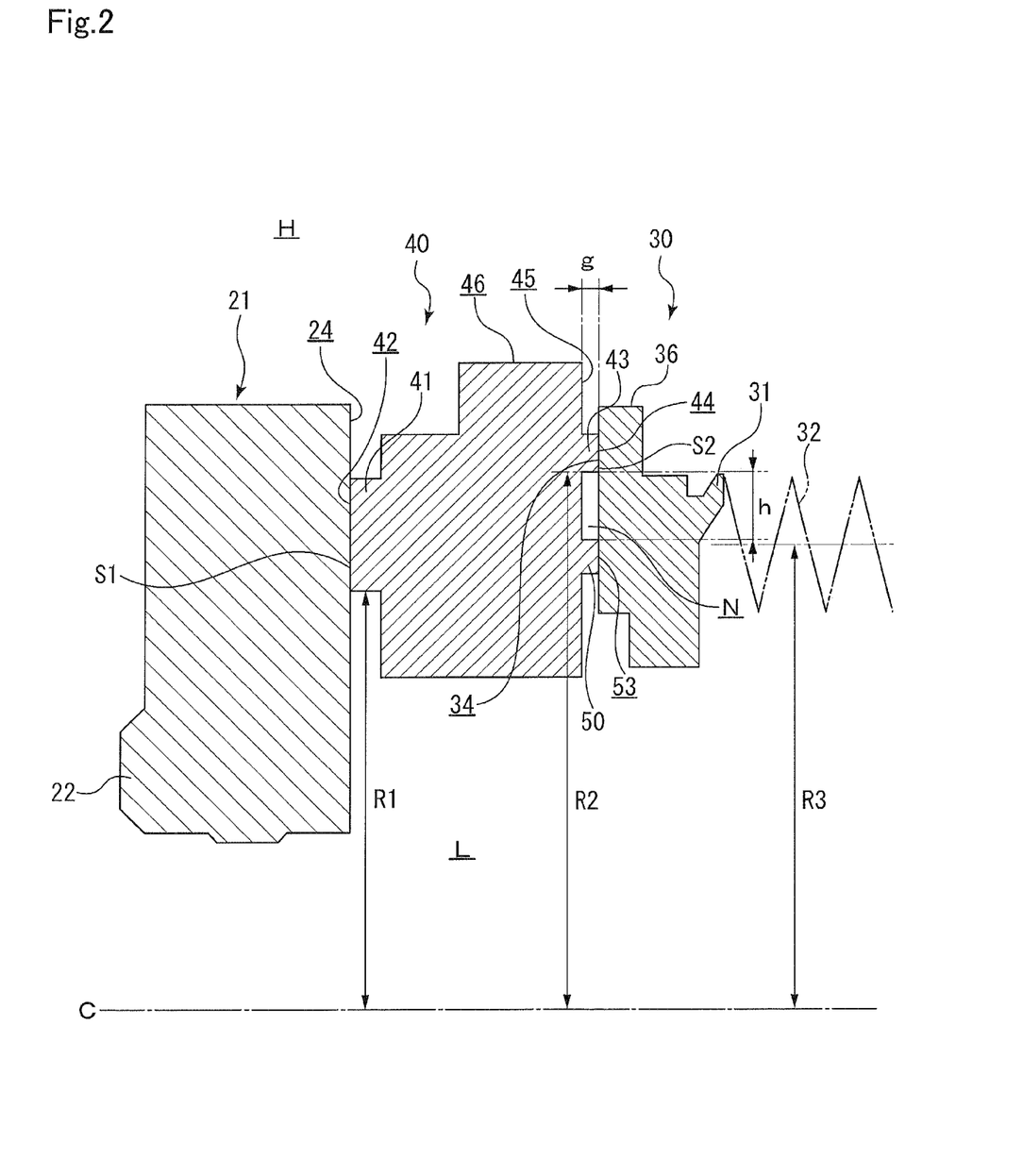
FIG. 2 is a sectional view of an enlarged part of FIG. 1.
Figure 3:
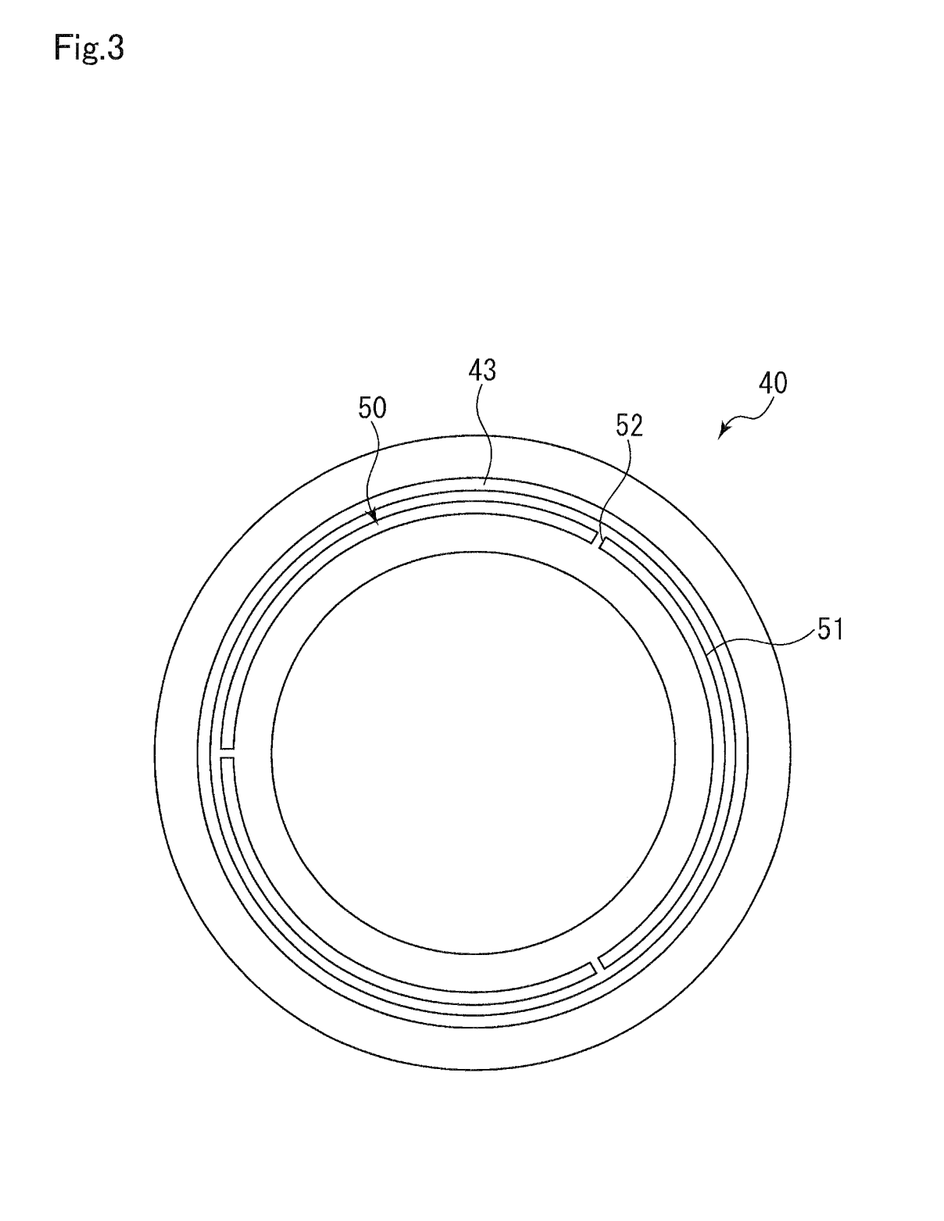
FIG. 3 is a side view of an intermediate ring shown in FIG. 2.
Figure 4:
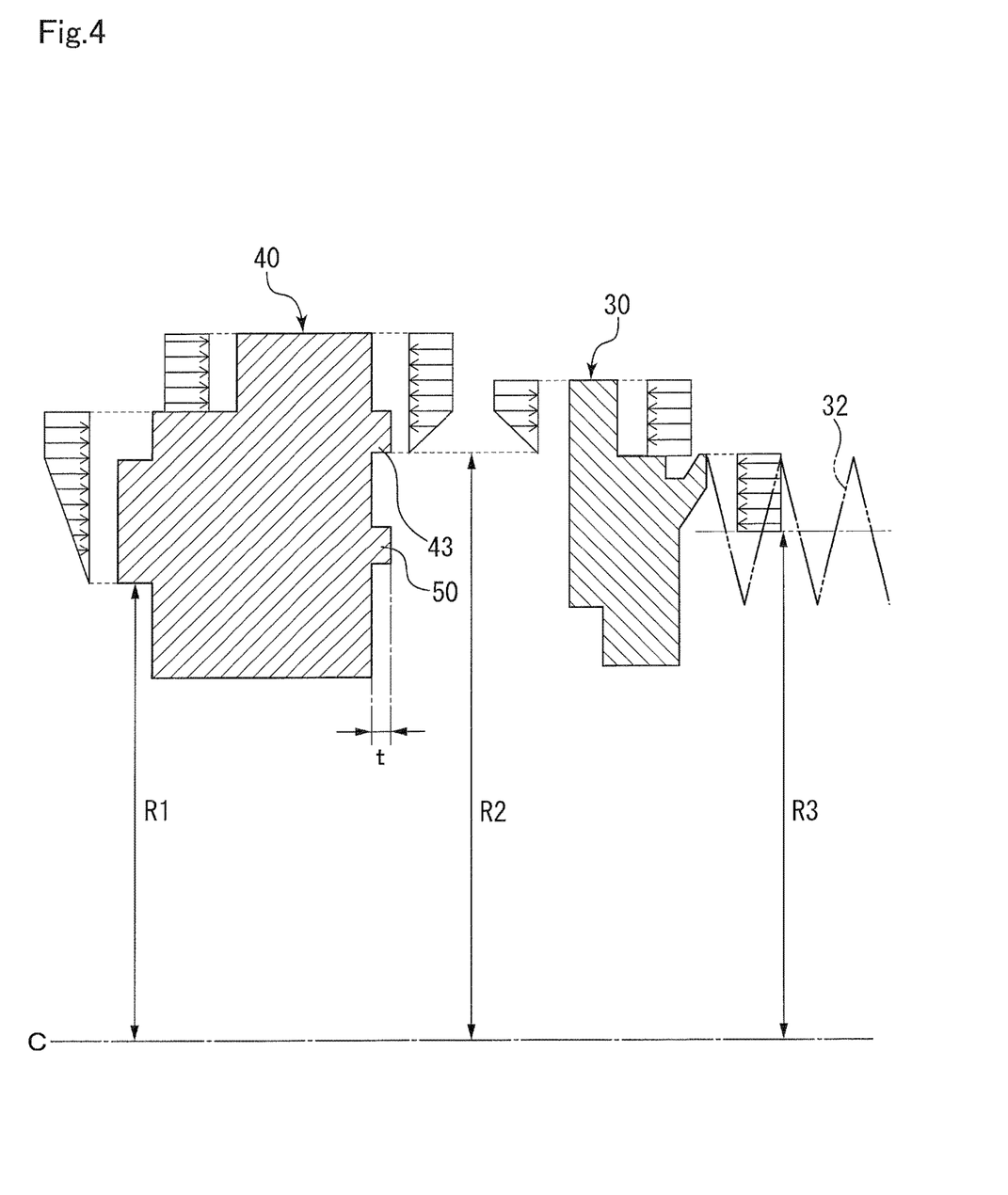
FIG. 4 is a conceptual diagram for explaining pressures acting on the intermediate ring and a stationary ring shown in FIG. 2.

A seamless continuous annular protrusion 41 extending along the circumference direction and a seamless continuous annular protrusion 43 extending along the circumference direction are integrally formed respectively on each side of the intermediate ring 40 in the axial direction. Tip end surfaces of the annular protrusion 41 and the annular protrusion 43 constitute the sliding surface 42 and the sealing surface 44, respectively. As described above, the part where the sliding surface 24 and the sliding surface 42 make a surface contact with each other constitutes the effective seal portion S1 and the part where the sealing surface 34 and the sealing surface 44 make a surface contact with each other constitutes the effective seal portion S2. As shown in FIG. 2, a radial distance R1 between a central axis C of the intermediate ring 40 and an innermost diameter of the effective seal portion S1 (a boundary of the region where the pressure of the sealed fluid is applied) is formed to be shorter than a radial distance R2 between the central axis C of the intermediate ring 40 and an innermost diameter of the effective seal portion S2 (a boundary of the region where the pressure of the sealed fluid is applied) (R1<R2). That is, the effective seal portions S1 and S2 are arranged at different distances from the central axis C of the intermediate ring 40 (arranged to be mutually deviated in the radial direction).

When the radial distances R1 and R2 are set in this manner (R1<R2), the effective seal portion S2 at the stationary ring 30 side is positioned more radially outside than the effective seal portion S1 at the rotating ring 21 side and an effective pressurized area at the stationary ring 30 side is smaller than that at the rotating ring 21 side. This configuration enables to keep the effective seal portions S1 and S2 in a closed stat, i.e., a sealed state based on the relation of the pressures of the sealed fluid applied to the rotating ring 21, the stationary ring 30, and the intermediate ring 40 (FIG. 4) as compared to a case where the radial distance R1 is set larger than the radial distance R2 (R1>R2). Further, when an effective radial distance R3 between the central axis C and the bellows is set smaller than the radial distance R1 (R1>R3), the effective seal portions S1 and S2 are easily kept in the closed state.

For the following reasons, the effective seal portions S1 and S2 may be arranged to be mutually deviated in the radial direction. For example, there is a case in which a radial width of the sliding surface 42 is changed to adjust a sliding surface pressure. Further, there is a case in which a known dynamic pressure generating groove is arranged on the sliding surface 24 or the sliding surface 42 constituting the effective seal portion S1. In such a case, it is unavoidably necessary to secure a certain length of the effective seal portion S1 in the radial direction. Further, the mechanical seal 20 is installed by being housed in a space between the rotating shaft 1 and the seal housing 5 and such a space is restricted by a structure of a rotating machine not illustrated. When the seal housing 5 is arranged on an outer diameter side of the stationary ring 30, there is a need to make an outer diameter of the stationary ring 30 smaller than that of the rotating ring 21. In this case, the annular protrusion 41 and the annular protrusion 43 arranged on both sides of the intermediate ring 40 are often arranged to be mutually deviated in the radial direction.

The load receiving portion 50 is constituted of three arcuate projection portions 51 (convex members) equally arranged in a circumferential direction. The load receiving portion 50 is integrally formed with the intermediate ring 40 so as to project in an annular shape from the intermediate ring 40 toward the stationary ring 30 with a distance from the annular protrusion 43 at the low-pressure side (at a side opposite to the sealed fluid, i.e., an inner diameter side in FIG. 1). Communication paths 52 extending in the radial direction are formed between the arcuate projection portions 51 adjacent to each other in the circumferential direction. An annular space N surrounded by the protrusion 43 and the load receiving portion 50 is communicated with the low-pressure side through the communication paths 52. Providing the communication paths 52 does not allow the load receiving portion 50 to function as a sealing surface or a balanced mechanical seal. That is, the balance diameter of the intermediate ring 40 can be kept constant in the presence of the load receiving portion 50. Further, the load receiving portion 50 is arranged at a position separated from the annular protrusion 43 by a distance h in the radial direction. Thus, the load receiving portion 50 only needs to oppose a smaller load as compared to a case where the load receiving portion 50 is arranged in contact with the annular protrusion 43, thereby enabling to surely and easily restrict the inclination of the intermediate ring 40 described below.

Further, a height t of the load receiving portion 50 in the axial direction (FIG. 4) is substantially equal to a distance g between a sealing surface 45 and the sealing surface 34 constituting side surfaces (FIG. 2), that is, a height of the annular protrusion 43. A side surface 53 of the load receiving portion 50 abuts on the sealing surface 34 constituting the side surface. When a slight inclination of the intermediate ring 40 in the radial distance is allowed, the height t in the axial direction is preferably set smaller than the distance g by an amount corresponding to the allowable range.

In a normal use, the pressing force applied by the effective seal portion S1 and the effective seal portion S2 having the positional deviation therebetween causes left-handed moment acting on the intermediate ring 40 to generate the deformation stress. As a result, the intermediate ring 40 is slightly inclined to a left direction (on the drawing sheet of FIG. 2) and this inclination increase a contact load at the effective seal portion S1, thereby contributing to improvement of the sealing property. Note that providing the load receiving portion 50 prevents excessive inclination of the intermediate ring 40, thereby allowing the effective seal portion S1 to constantly maintain a surface contact. Further, the load receiving portion 50 is arranged between the intermediate ring 40 and the stationary ring 30, thus, the rotation of the rotating ring 21 is not hindered. Note that, needless to say, the intermediate ring 40 may be configured not to be substantially inclined by adjusting the height t in the axial direction, the material, and the structure of the load receiving portion 50.

Figure 5:
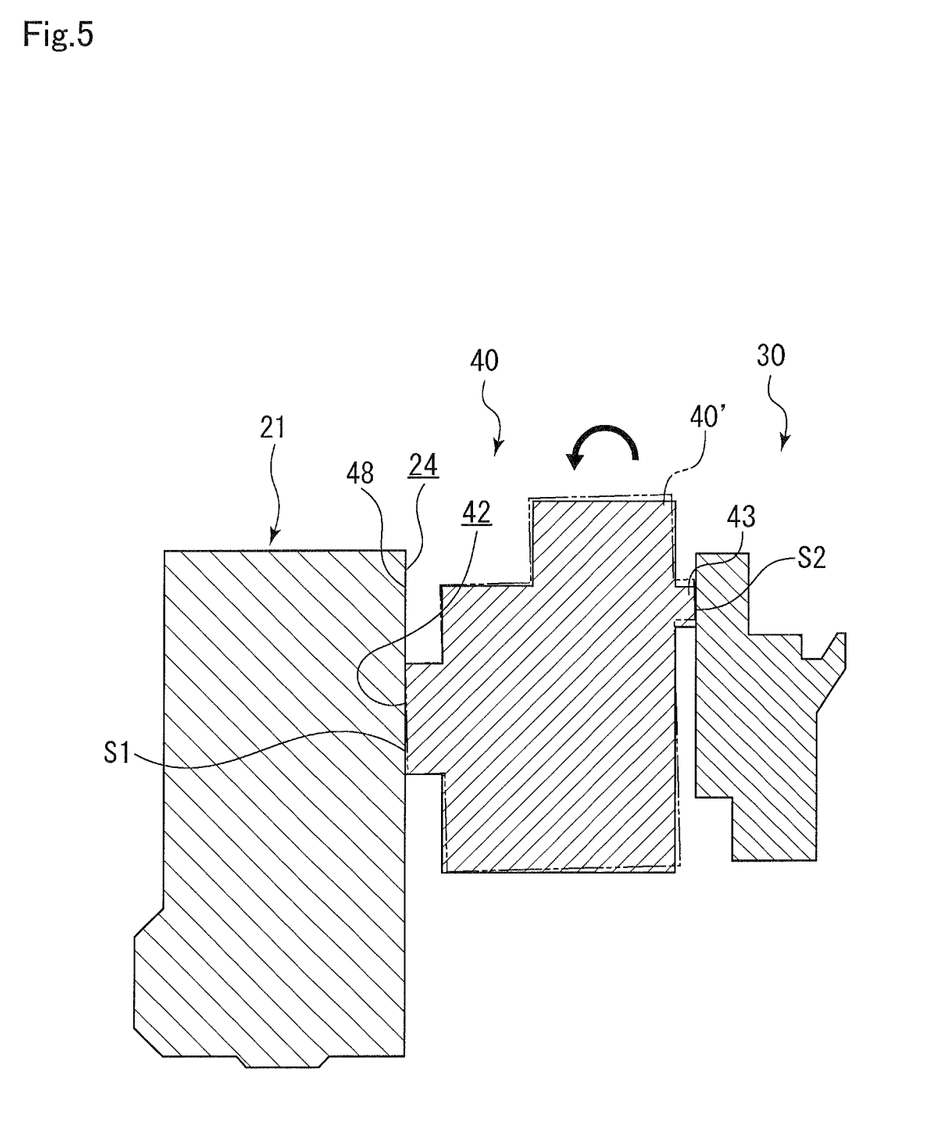
FIG. 5 is a perspective view illustrating a mechanical seal, in which a spacer is not used, of a comparative embodiment.

On the other hand, when the load receiving portion 50 is not provided, as shown in FIG. 5, the positional deviation between the effective seal portion S1 and the effective seal portion S2 creates the left-handed moment acting on the intermediate ring 40, thereby causing a risk that the intermediate ring 40 excessively inclines to the left direction (on the drawing sheet of FIG. 5). The excessive inclination (as shown by a broken line 40' in FIG. 5) causes an edge 48 of the annular protrusion 41 on an outer diameter side to slide with the sliding surface 24 of the rotating ring 21 and prevents the effective seal portion S1 from maintaining the surface contact. Thus, excessive wear occurs between the sliding surface 42 of the annular protrusion 41 of the intermediate ring 40 and the sliding surface 24 constituting the side surface of the rotating ring 21, thereby preventing the maintenance of the sealing property therebetween.

Further, the load receiving portion 50 is integrally formed with the intermediate ring 40 and has the same linear thermal expansion coefficient as that of the intermediate ring 40. Thus, even when a temperature change occurs, a difference in deformation by heat between the load receiving portion 50 and the intermediate ring 40 is small, thereby enabling to stably prevent the inclination of the intermediate ring 40.

Further, the annular space N is communicated with the low-pressure side L via the communication paths 52, thus the annular space N is prevented from being a sealed space and the pressure of the annular space N is prevented from becoming excessively high or excessively low.

Second Embodiment

Figure 6:
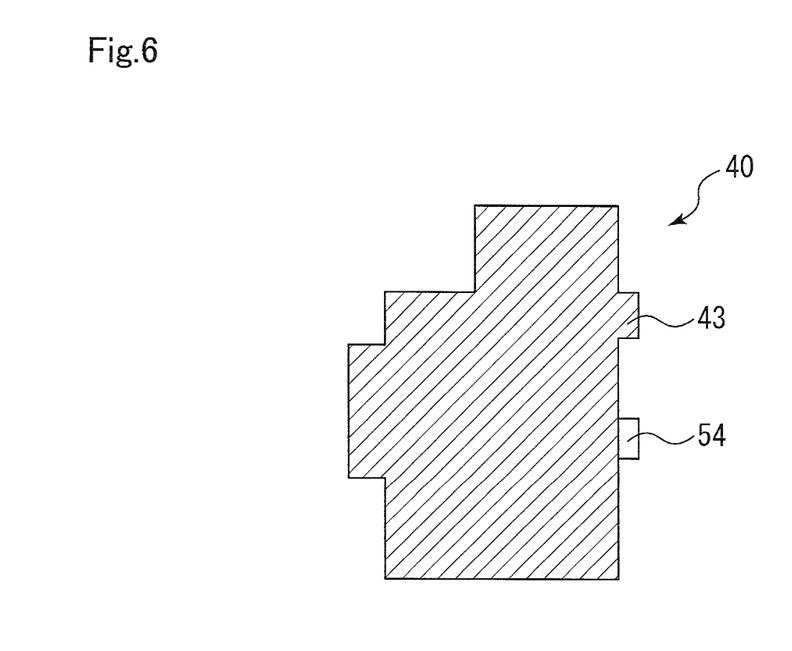
FIG. 6 is an enlarged sectional view of an intermediate ring and a load receiving portion of a second embodiment of the mechanical seal according to the present invention.
Figure 7:
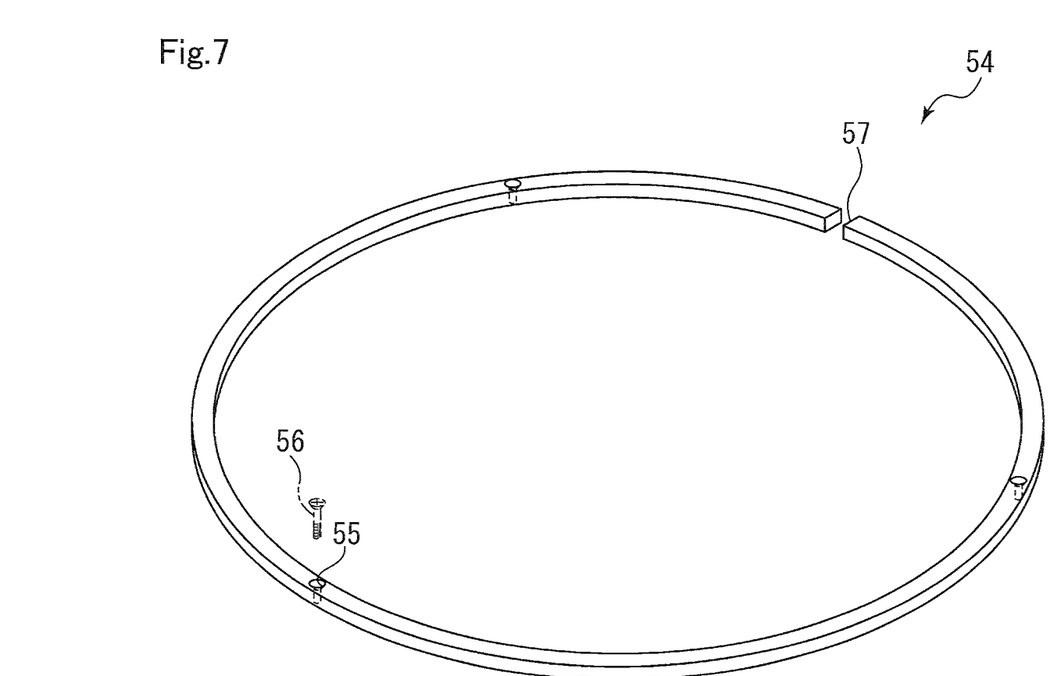
FIG. 7 is a perspective view illustrating the load receiving portion shown in FIG. 6.

Next, a mechanical seal according to a second embodiment is described with reference to FIG. 6 and FIG. 7. The second embodiment is different from the first embodiment in a shape of a load receiving portion 54 and a configuration in which the load receiving portion 54 and the intermediate ring 40 are formed separately. Note that duplicate descriptions of the same configuration and effects thereof as those of the first embodiment will be omitted.

The load receiving portion 54 is formed in a substantially C-shape by having a notch 57 (a communication path) in a part of an annular body. The load receiving portion 54 is made of the same material as that of the intermediate ring 40 or a material having the same linear thermal expansion coefficient. Thus, when a temperature change occurs, the load receiving portion 54 is deformed in the same manner as the intermediate ring 40. As a result, the load receiving portion 54 can prevent the generation of stress acting on the intermediate ring 40 upon the temperature changes and exert an inclination prevention function without being affected by the temperature change. Further, the notch 57 functions as the communication path to communicate the low-pressure side L and the annular space N, so that the annular space N is prevented from being the closed space. Further, providing the notch 57 prevents a change in the radial direction, thereby enabling to prevent a change in a load receiving position in the radial direction.

The load receiving portion 54 is fastened to the intermediate ring 40 by screws 56 through bolt holes 55 equally arranged on the load receiving portion 54. Installing the load receiving portion 54 to the intermediate ring 40 can stabilize the position of the load receiving portion 54 in the radial direction and in the circumferential direction to precisely prevent the inclination of the intermediate ring 40.

Note that installation of the load receiving portion 54 to the intermediate ring 40 may be performed by any means other than the screws 56, as long as relative movement between the load receiving portion 54 and the intermediate ring 40 is restricted.

Further, the explanation has been given to the example in which the screws 56 are installed into the intermediate ring 40 from the axial direction to install the load receiving portion 54, however, the screws 56 may be installed from other directions.

Third Embodiment

Next, a mechanical seal according to a third embodiment is described with reference to FIG. 8. In the third embodiment, an explanation is given of a case where an outer diameter side of the intermediate ring 40 is the low-pressure side L and an inner diameter side is the high-pressure side H. Positions where annular protrusions 41A and 43A of the intermediate ring 40 are arranged and a position where a load receiving portion 50A is arranged are different from those in the first embodiment. Note that duplicate descriptions of the same configuration and effects thereof as those of the first embodiment will be omitted.

Figure 8:
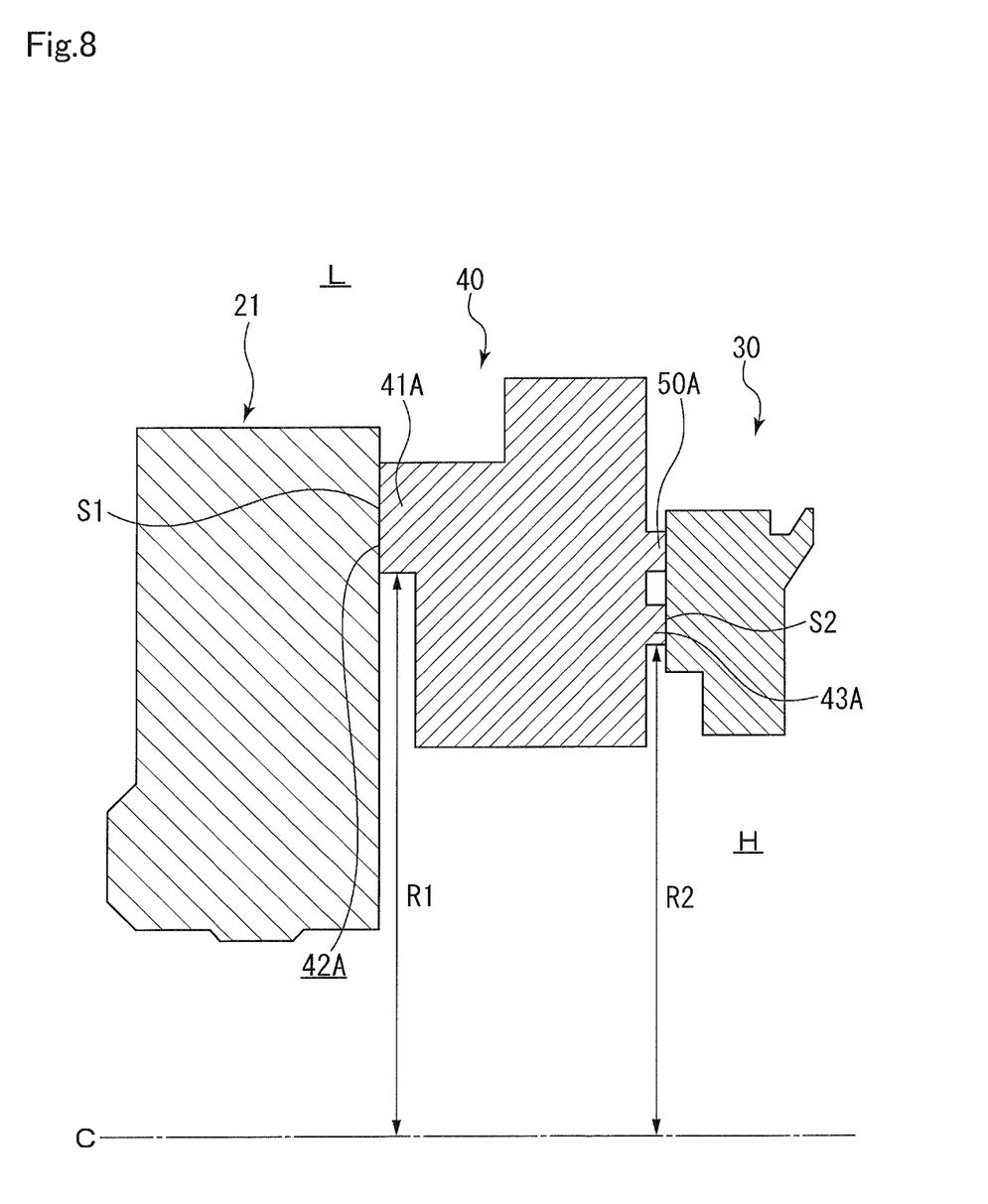
FIG. 8 is a sectional view of a third embodiment of the mechanical seal according to the present invention.

As shown in FIG. 8, the radial distance R1 between the central axis C of the intermediate ring 40 and the innermost diameter of the effective seal portion S1 (a boundary of the region where the pressure of the sealed fluid is applied) is formed to be longer than the radial distance R2 between the central axis C of the intermediate ring 40 and an innermost diameter of the effective seal portion S2 (a boundary of the region where the pressure of the sealed fluid is applied). That is R1>R2. Therefore, the effective seal portions S1 and S2 are arranged at different distances from the central axis C of the intermediate ring 40 (arranged to be mutually deviated in the radial direction). Further, the load receiving portion 50A is arranged on the outer diameter side of the annular protrusion 43A.

The embodiments of the present invention have been described above with the drawings. However, specific configurations are not limited to these embodiments, and modifications and additions that are made within the range not departing from the gist of the present invention are also included in the present invention.

For example, the explanation has been given to the example in which the annular protrusions 41 and 41A are arranged on the intermediate ring 40, however, they may be arranged on the rotating ring 21. Similarly, the annular protrusions 43 and 43A may be arranged on the stationary ring 30.

Further, the explanation has been given to the example in which the load receiving portion 50 is arranged on the intermediate ring 40, however, it may be arranged on the stationary ring 30.

REFERENCE SIGNS LIST

1 Rotating shaft
5 Seal housing
13 Spring
20 Mechanical seal
21 Rotating ring
24 Sliding surface
30 Stationary ring
32 Bellows
34 Sealing surface
40 Intermediate ring
41 Annular protrusion
41A Annular protrusion
42 Sliding surface
42A Sliding surface
43 Annular protrusion
43A Annular protrusion
44 Sealing surface
44A Sealing surface
45 Side surface
46 Outer circumferential surface
48 Edge
50 Load receiving portion
50A Load receiving portion
51 Arcuate projection portion (convex member)
52 Communication path
54 Load receiving portion
57 Notch (communication path)
A Atmospheric region
M Sealed region
C Central axis
H High-pressure side
L Low-pressure side
N Annular space
S1 Effective seal portion (first annular effective seal portion)
S2 Effective seal portion (second annular effective seal portion)
R1 Radial distance between central axis C and effective seal portion S1
R2 Radial distance between central axis C and effective seal portion S2
R3 Effective radial distance between central axis C and bellows

The invention claimed is:

1. A mechanical seal that seals a sealed fluid by interposing an intermediate ring between a rotating ring and a stationary ring, said seal comprising:
    a first annular effective seal portion where the rotating ring and the intermediate ring slide with each other; and
    a seamless continuous annular protrusion formed in the intermediate ring or the stationary ring as a second annular effective seal portion where the stationary ring and the intermediate ring contact with each other, the rotating ring, the intermediate ring, and the stationary ring being concentrically arranged in a state in which a radius distance of a region of the first annular effective seal portion where a pressure of the sealed fluid is applied and a radius distance of a region of the second annular effective seal portion where a pressure of the sealed fluid is applied are different from each other; and
    a load receiving portion arranged between the intermediate ring and the stationary ring in opposition to a side of the sealed fluid across the seamless continuous annular protrusion in a radial direction, and formed with the intermediate ring or the stationary ring so as to project in an annular shape from the intermediate ring toward the stationary ring or from the stationary ring toward the intermediate ring with a distance from the seamless continuous annular protrusion at a low-pressure side, wherein
    the load receiving portion includes a communication path communicating inside and outside sections in the radial direction, and
    an annular space surrounded by the seamless continuous annular protrusion and the load receiving portion is communicated with the low-pressure side through the communication path.

2. The mechanical seal according to claim 1, wherein the load receiving portion is constituted of a plurality of arcuate projection portions arranged at equal intervals in the circumferential direction, and the communication path is one of the communication paths which are formed between the arcuate projection portions adjacent to each other in the circumferential direction.

3. The mechanical seal according to claim 2, wherein the load receiving portion is immovably arranged to the stationary ring or the intermediate ring.

4. The mechanical seal according to claim 2, wherein the load receiving portion is formed of a material having the same linear thermal expansion coefficient as that of the stationary ring or the intermediate ring.

5. The mechanical seal according to claim 1, wherein the load receiving portion is immovably arranged to the stationary ring or the intermediate ring.

6. The mechanical seal according to claim 5, wherein the load receiving portion is formed of a material having the same linear thermal expansion coefficient as that of the stationary ring or the intermediate ring.

7. The mechanical seal according to claim 1, wherein the load receiving portion is formed of a material having the same linear thermal expansion coefficient as that of the stationary ring or the intermediate ring.

* * * * *